US008589494B2

(12) United States Patent
Garrett (10) Patent No.: US 8,589,494 B2
(45) Date of Patent: Nov. 19, 2013

(54) EMAIL FORWARDING TUNNEL CAPTURING OR TAGGING

(75) Inventor: Jim Garrett, Lee's Summit, MO (US)

(73) Assignee: CenturyLink Intellectual Property LLC, Denver, CO (US)

(*) Notice: Subject to any disclaimer, the term of this patent is extended or adjusted under 35 U.S.C. 154(b) by 940 days.

(21) Appl. No.: 11/904,856

(22) Filed: Sep. 28, 2007

(65) Prior Publication Data
US 2009/0089382 A1 Apr. 2, 2009

(51) Int. Cl.
G06F 15/16 (2006.01)
(52) U.S. Cl.
USPC ............ 709/206; 709/204; 709/205; 709/207
(58) Field of Classification Search
USPC ................... 709/204, 205, 206, 207
See application file for complete search history.

(56) References Cited

U.S. PATENT DOCUMENTS

| | | | |
|---|---|---|---|
| 5,694,616 A | 12/1997 | Johnson et al. | |
| 5,878,230 A * | 3/1999 | Weber et al. | 709/238 |
| 6,029,192 A * | 2/2000 | Hill et al. | 709/206 |
| 6,671,718 B1 | 12/2003 | Meister et al. | |
| 7,185,108 B1 * | 2/2007 | Okachi | 709/240 |
| 7,430,580 B2 * | 9/2008 | Baratakke et al. | 709/206 |
| 7,552,178 B2 * | 6/2009 | Chen et al. | 709/206 |
| 7,587,678 B1 * | 9/2009 | English et al. | 715/752 |
| 2002/0138584 A1 | 9/2002 | Fujimoto et al. | |
| 2002/0194284 A1 | 12/2002 | Haynes | |
| 2005/0021633 A1 * | 1/2005 | Venkatraman et al. | 709/206 |
| 2005/0066005 A1 * | 3/2005 | Paul | 709/206 |
| 2005/0108402 A1 * | 5/2005 | Colson et al. | 709/227 |
| 2005/0132066 A1 * | 6/2005 | Heilmann | 709/228 |
| 2005/0267944 A1 | 12/2005 | Little, II | |
| 2007/0130329 A1 * | 6/2007 | Shah | 709/224 |
| 2008/0282155 A1 | 11/2008 | Kempenna | |
| 2009/0089391 A1 | 4/2009 | Garrett | |
| 2009/0119370 A1 * | 5/2009 | Stern et al. | 709/206 |

OTHER PUBLICATIONS

Non-Final Rejection date mailed Oct. 28, 2009 in U.S. Appl. No. 11/904,920.
Response filed Nov. 19, 2009 to Non-Final Rejection dated Oct. 28, 2009 in U.S. Appl. No. 11/904,920.
U.S. Appl. No. 11/904,920; Final Rejection dated Apr. 13, 2010; 19 pages.
U.S. Appl. No. 11/904,920; Notice of Abandonment dated Apr. 15, 2011; 2 pages.

* cited by examiner

*Primary Examiner* — Harunur Rashid
(74) *Attorney, Agent, or Firm* — Swanson & Bratschun, L.L.C.

(57) ABSTRACT

An email forward tagging system including means for selecting on a sender's email client a receiver's email address; means for displaying to the sender's email client a tagging function; means for selecting on the sender's email client the tagging function; means for sending, via a common email system protocol, an email from a email-sending server to a first email-receiving server; means for receiving, via the common email system protocol, the email at the first receiver's email server from the email-sending server; means for sending the received email in the form of one of a forward email and a reply email to a second email-receiving server connected to the network; and means for automatically forwarding the one of the forward email and the reply email to the sender's email address when the sender's email address is omitted from the one of said forward email and said reply email.

18 Claims, 7 Drawing Sheets

EMAIL FORWARDING TUNNEL CAPTURING OR TAGGING

FIELD OF THE INVENTION

The field of the invention is directed to electronic messaging, and more specifically to automatically forwarding tagged or encapsulated electronic messages back to a previous sender.

BACKGROUND OF THE INVENTION

The proliferation of email volume today, in part, is due to its ease of use, especially because of its ease of use to facilitate and answer communications, inquiries, and messages. For example, if an email sender requests and answer regarding a particular topic or matter from an email receiver, an email is quickly prepared and instantly delivered to the email receiver. One benefit to email is that if the email receiver is unable to handle or answer the communication, they can quickly forward the original email to other email receivers for their input. This type of activity can continually branch out creating complex chains and strings of email receivers. Oftentimes, an email receiver somewhere in the email chain or string is able to answer or respond to the original communication or inquiry, but somewhere along the chain of subsequent emails the original email sender is accidentally omitted from the address list. In one instance, this can occur when a subsequent email sender selects "reply" instead of "reply to all." In this instance the original email sender may be omitted from the addressee line. Thus, the response is never communicated back to the original sender.

For example, an employee receives an inquiry via email from a customer of the employee's company, but the employee doesn't readily have the answer. In this case, the employee may forward the original email inquiry to their boss who then responds with an answer to the inquiry. In this example, if the employee failed to forward the email response back to the customer, then the customer would not ever receive the response. When the original author fails to receive a final response to their inquiry, they must expend additional time and efforts to send a reminder email to the email receivers requesting the response that was never sent to them.

SUMMARY

The above described problems are solved and a technical advance achieved by the present Email Forwarding Tunnel Capturing or Tagging ("Email Forward Tagging System"). In one embodiment, the present Email Forward Tagging System provides a Graphical User Interface ("GUI") to an email sender allowing them to forward their original or a subsequent email, including later subsequent email responses and messages, back to the email sender. The original author or any subsequent authors may use the Email Forward Tagging System to tag the email to ensure that the final email in a chain or string of emails is automatically forwarded back to the original author. By doing so, an email sender, whether original or subsequent, may ensure that their email including subsequent responses and messages is forwarded back to them, thus alleviating the necessity of exerting time and effort to track down an email response. Once the final author has provided an answer or response, that email is tagged and forwarded back to the sender, whether original or subsequent, that used the Email Forward Tagging System.

In one embodiment, a display is presented to an email sender with settings for tagging the email for ultimate forwarding back to the email sender once the email string or chain has terminated or otherwise ended. In another embodiment, an icon is displayed in the email to denote that it is a tagged email so that subsequent authors will provide their comments with notice that it they will ultimately be sent to the original author. In another embodiment, no such icon is provided and when the email string ends with the last response it will be automatically forwarded to the original author.

In one embodiment, the Email Forward Tagging System includes means for selecting on a sender's email client a receivers email address; means for displaying to the sender's email client a tagging function; means for selecting on the sender's email client the tagging function; means for sending, via a common email system protocol, an email from a email-sending server to a first email-receiving server, means for receiving, via the common email system protocol, the email at the first receiver's email server from the email-sending server, means for sending the received email in the form of one of a forward email and a reply email to a second email-receiving server connected to the network; and means for automatically forwarding the one of the forward email and the reply email to the sender's email address when the sender's email address is omitted from the one of said forward email and said reply email.

DETAILED DESCRIPTION OF THE DRAWINGS

In the drawings, like or similar elements are designated with identical reference numerals throughout the several views and figures thereof, and various depicted elements may not be drawn necessarily to scale.

Conventionally, an email address is made up of several parts, such as a user name, domain name, and general. The user name is the name or pseudo name of the addressee, such as "johndoe." The domain name is the provider or internet service provider ("ISP") of the simple mail transfer protocol ("SMTP") server, such as "aol" for America Online®. The general is the top level extension at the end of the email address, such as ".com," ".net," ".org," and ".gov." The "@" symbol separates the user name and the domain name, so for example, an email address could be "johndoe@aol.com."

Figure 1:
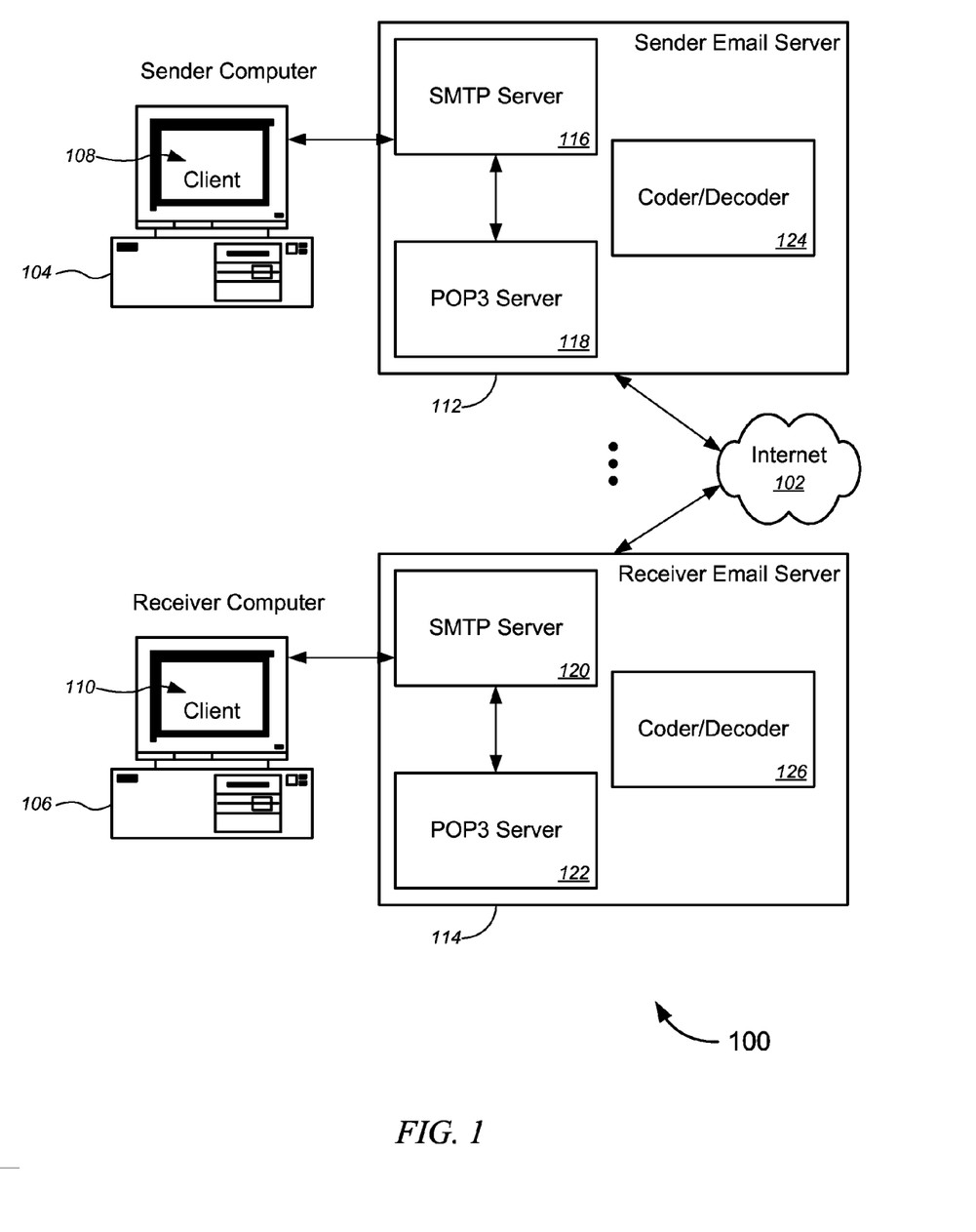
FIG. 1 illustrates a block diagram of an exemplary network of computers for an email application according to an embodiment of the present invention.

FIG. 1 is a block diagram of an embodiment of a standard email system for sending and receiving email on the Internet and is used to explain the Email Forward Tagging System. The standard email system follows a standard industry protocol for handling email on the Internet, referred to as SMTP. SMTP is a Transmission Control Protocol/Internet Protocol ("TCP/IP") protocol for sending email between servers. Virtually all email systems that send email over the Internet use SMTP. Typically, an email is sent via SMTP to a POP3 (Post Office Protocol) server ("email server") where an addressee retrieves the email. Because of SMTP and POP3, an addressee specifies both the POP3 server and SMTP server when they set up their email account using their email client application, such as Microsoft® Outlook®, Eudora®, Pegasus, etc. An email client is generally a software application that is run on an email sender's computer 104 and an email receiver's computer 106 that displays text and menus on the monitor of the computers 104 and 106. The email client application 108 and 110 generally resides on the local drive or memory of the computers 104 and 106. The computers 104 and 106 may be in communication with standard memories, input/output (I/O) units, and a storage units. The storage units may store databases or data repositories thereon. The software may include instructions for execution by the processor for providing network connectivity information and the like. In one embodiment, the software is composed of a instructions for displaying GUI options menus and submenus to a user as further described herein.

Among other email functions, the email clients 108 and 110 generally display to a user or addressee all of the messages that are in their inbox, by displaying message headers that include the sender of the email, subject of the email, and the time and date that the email was sent. The email clients 108 and 110 also allow the user or addressee to create new messages and send them to other users or addressees. Thus, for purposes of the present Email Forward Tagging System, an email client 108 and 110 will be considered part of the email sender's computer 104 and email sender's computer 106, shown as email clients 108 and 110 respectively.

In FIG. 1 is shown two separate email servers, an email sender's email server 112 and an email receiver's email server 114. Typically, email servers 112 and 114 are used to handle the email service functions. For example, email servers 112 and 114 connect to the email clients 108 and 110 to send and receive email. Typically SMTP servers are for handling the outgoing mail, and POP3 or Internet Mail Access Protocol ("IMAP") servers are for handling the incoming email. In FIG. 1 is shown an email sender's SMTP server 116 and POP3 server 118 and an email receiver's SMTP server 120 and POP3 server 122. In general, both the email sender's SMTP server 116 and the POP3 server 118 operate together to make up the email sender's email server 112. Likewise, the email receiver's SMTP server 120 and POP3 server 122 operate together to make up the email receiver's email server 114.

When a user subscribes to an ISP, they usually also gain access to that ISP's SMTP server. Users access the Internet 102 through their ISP using a dialup or high-speed line connection and a standard browser, such as Internet Explorer® or Netscape®. ISPs typically have one or more SMTP servers.

SMTP servers 116 and 120 generally interact with email clients 108 and 110, respectively, to send email from an email sender to an email receiver. The ISP operates at a website address corresponding to its domain name which is addressable by users on the Internet 102. The ISP's service functions are performed for a large number of subscribers through one or more servers. The ISP or host SMTP server may interact with other SMTP servers over the Internet 102 when sending emails. When a user sets up an email account with their ISP, they set their email client 108 to the name of the ISP mail server 112, such as "johndoe.johndoe.com." When an email sender sends and email to an email receiver, the email sender's email client 108, which resides on the email sender's computer 104, typically communicates with their ISP's SMTP server 116 telling the SMTP server 116 the email address of the email sender, the address of the email receiver, and the body of the email in addition to other information. The email sender's SMTP server 116 breaks down the email receiver's address into the email receiver's user name and the domain name. If the email receiver's user name is a member of the same ISP or domain name, email server 112, as the email sender's, the SMTP server 116 will send the email to the POP3 server 118 located at the ISP for delivery to the email receiver. If the email receiver is not a member of the email sender's SMTP server 116, then the email sender's SMTP server 116 will need to communicate with another SMTP server 120, email server 114, via the Internet 102, at the email receiver's ISP or domain name.

This communication involves the email sender's SMTP server 116 inquiring at the Domain Name Server ("DNS") for the Internet Protocol address ("IP address") for the SMTP server for the domain, for example "yyy.com," of the email receiver. The DNS returns to the email sender's SMTP server 116 with the IP address of one or more SMTP servers 120 for the domain name "yyy.com" of the email receiver. The email sender's SMTP server 116 then connects with the SMTP server 120 for the email receiver and inquires whether the IP address of the email receiver is at the SMTP server 120 for the email receiver. If the email receiver's IP address is at the email receiver's SMTP server 120, then the email sender's SMTP server 116 transmits the spam message to the email sender's domain name or email server 114, which is then transmitted to the email receiver's POP3 server 122, which puts the message in the inbox of the email receiver's email client 110.

To receive the email, the email receiver logs into their POP3 server 122 from their email client 110 that resides on their local computer 106 and issues a series of commands to the email receiver's POP3 server 122. The POP3 server 122 then opens the email text file and transmits the email to the email receiver's local computer 106. Generally, the POP3 server 122 acts as an interface between the email receiver's email server 114 and their email client 110. After transmitting the email to the email receiver's email client 110, the email is deleted from the email receiver's POP3 server 122. The above relating to POP3 servers can also be employed on an IMAP server as well. An IMAP server holds or stores the email instead of deleting it so that it can be accessed later. Email servers 112 and 114 also typically employ queues for holding email that is not able to be transmitted instantly due to a problem or connection with other SMTPs over the Internet.

An email application of the Email Forward Tagging System further may include a receiver coder/decoder, preferably in the form of instructions or software that resides on both the email sender's email server 112 and the email receiver's email server 114. The coder/decoder 124 may also operate on the email sender's computer 104 and the email receiver's computer 106 in conjunction with the email sender's email client 108 and the email receiver's email client 106. Further, the coder/decoder 124 may include hardware, computer readable memory, or both, for storing the prioritized emails.

Figure 2:
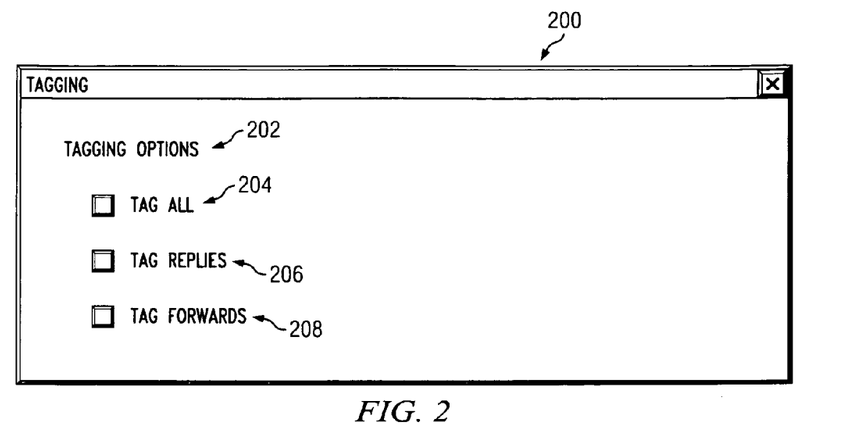
FIG. 2 illustrates an exemplary screenshot from a GUI depicting a tagging options display of Email Forward Tagging System according to an embodiment of the present invention.

As discussed above, the email sender's email client 108 and email receiver's email client 110 further includes instructions or software for presenting options menus to the email sender and email receiver. FIG. 2 illustrates an embodiment 200 of an exemplary screenshot of a GUI depicting tagging options 202 of the Email Forward Tagging System. In one embodiment, tagging options 200 include several options for an email sender to choose those emails that they wish to the tagged and forwarded back to the email sender. For example, if an email sender wishes to tag all subsequent email "replies," then they would select the tag replies setting 206. The tag replies setting 206 will automatically tag all subsequent email replies sent by any subsequent email user to be forwarded back to the original email sender. In this aspect, all subsequently replied emails in the string relating to the original email request will be tagged and automatically forwarded back to the original email sender without any subsequent email user having to include the original email sender in the address lines as discussed further in FIGS. 4-6.

In another aspect, if the email sender wishes to tag all subsequent email "forwards," then they would select the tag forwards setting 208. The tag forwards setting 208 will automatically tag all subsequent email forwards send by any subsequent email user to be forwarded back to the original email sender. In this aspect, all subsequently forwarded emails in the string relating to the original email request will be tagged and automatically forwarded back to the original email sender without any subsequent email user having to include the original email sender in the address lines as discussed further in FIGS. 4-6. In yet another aspect, if the email sender wishes to tag all subsequent email replies and forwards, then the email sender may select the tag all setting 204. The tag all setting 204 forwards all replies and forwards in the email string automatically to the original email sender without any subsequent author or sender including the email sender's address in the address lines.

In one embodiment, once any of the tag all setting 204, tag replies setting 206, and tag forwards setting 208 have been selected by the original email sender, they may not be deleted or removed by subsequent email senders, receivers, or responders by the Email Forward Tagging System. In this embodiment, this is to ensure that those desired forwards, replies, or both are always automatically forwarded back to the original email sender. In another embodiment, the Email Forward Tagging System may allow subsequent email users to delete the original email user's address from the address line, but the Email Forward Tagging System may be sent an email notifying them that such an action has occurred.

Figure 3:
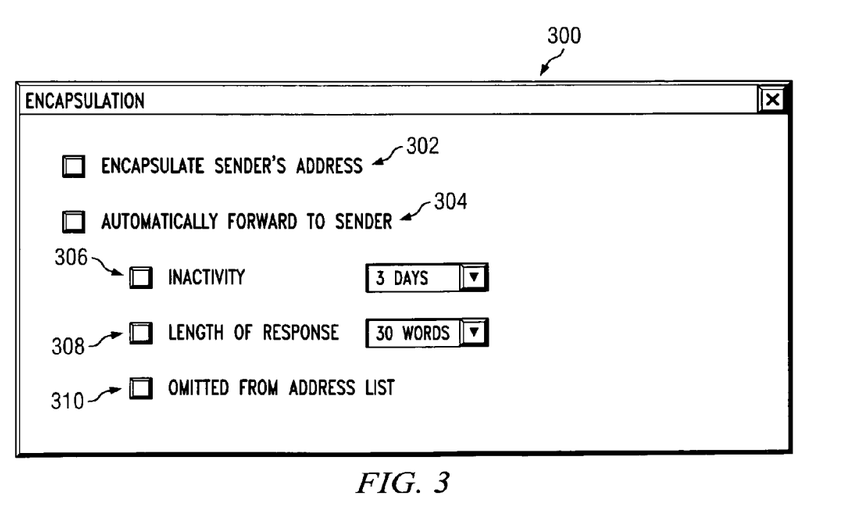
FIG. 3 illustrates an exemplary screenshot from a GUI depicting an encapsulation options display of Email Forward Tagging System according to an embodiment of the present invention.

FIG. 3 illustrates an embodiment 300 of an exemplary screenshot of a GUI depicting encapsulation options of the Email Forward Tagging System. In this embodiment, an original or subsequent email sender may select to have their email address encapsulated as a data file or other type of computer readable file that accompanies each subsequent email sent. The Email Forward Tagging System then may automatically forward the original email and any subsequent replies and forwards based on certain criteria selected by the email sender. To encapsulate their email address, they may select the encapsulate sender's address setting 302 and the automatically forward to sender setting 304 of the Email Forward Tagging System and it encapsulates the email sender's address into such a data file that accompanies a particular email.

These criteria for automatically forwarding the emails back to the original sender may be based on several factors. For example, if the email sender wishes to have their original email and any subsequent forwards or replies sent back to them after a period of inactivity, then they may select the inactivity setting 306 and adjust the amount of time after which the email string will be forwarded back the original email sender. Another such criteria involves determining the amount of words contained in the body of a particular replied or forwarded email and then automatically forwarding back to the email sender those emails that meet a threshold word count. This may be done by selecting the length of response setting 308. For example, the word count in the body 602 of the email 600 is five. (See FIG. 6) Further, if subsequent email receivers, responders, or senders intentionally omit the email address of the original sender from the email string, then the Email Forward Tagging System may append the original email address back into the address line of any subsequent replies or responses when the original email sender selects the omitted from address list setting 310.

Figure 4:
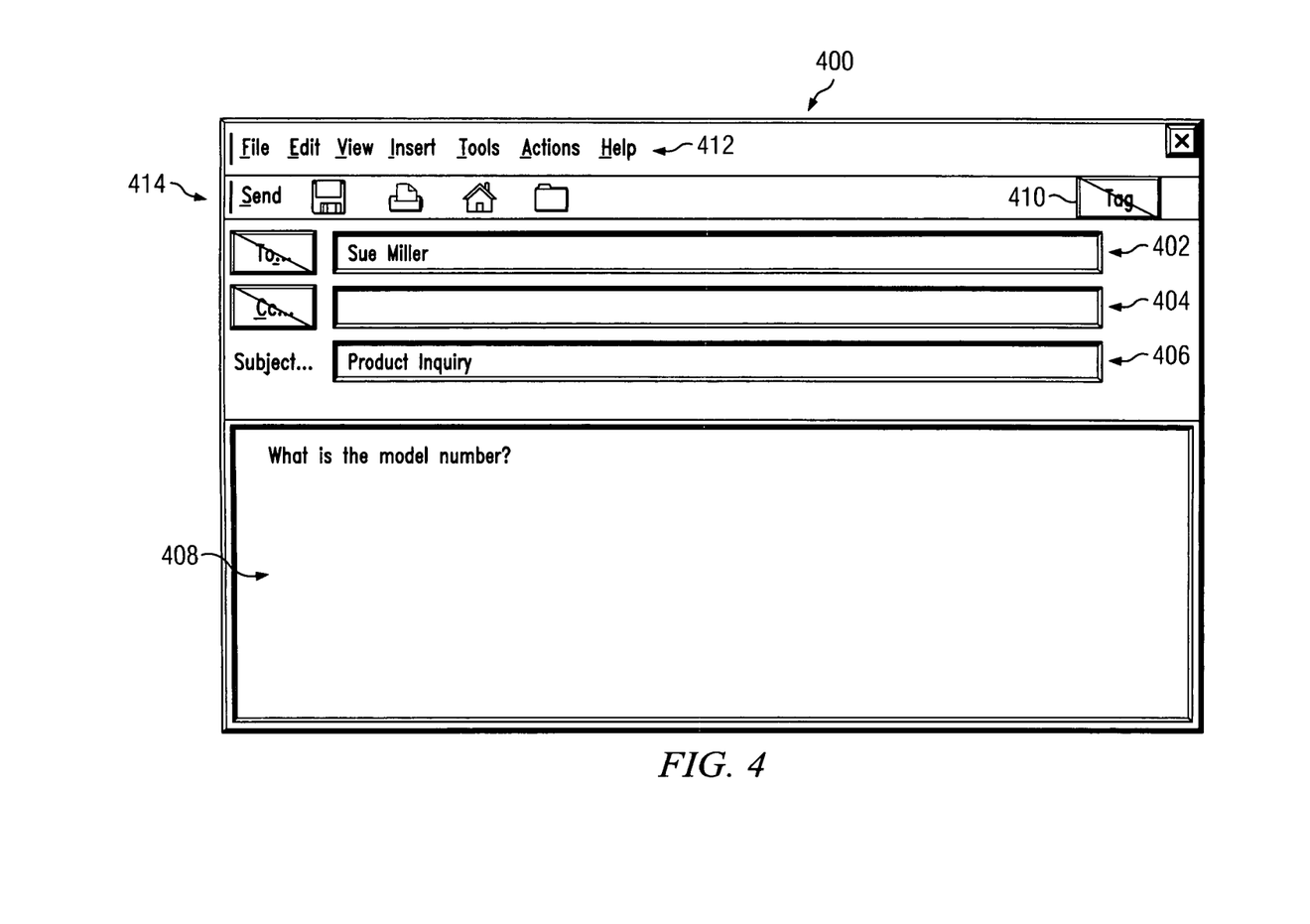
FIG. 4 illustrates an exemplary screenshot from a GUI depicting an original email page display of Email Forward Tagging System according to an embodiment of the present invention.

FIG. 4 illustrates an embodiment 400 of an exemplary screenshot of a GUI depicting an email message of the Email Forward Tagging System. In one embodiment, an email sender opens or initiates an email message 400 that may includes menu options 412 and actions options 414, such as "Send." Further, email message includes a "To" address line 402, "CC" address line 404, "Subject" line 406, and body 408. In this embodiment, an email sender with an email address, such as sender@cust.com, may prepare an email message by inserting the email receiver's address, shown as "Sue Miller," for example, in the To address line 402 and inputting a brief description of the email message in the Subject line 306, such as "Product Inquiry." Then the email sender types the message in the body 408 as shown in FIG. 4. Once the message is completed, then the email sender sends the email message to the email receiver as described above.

Figure 5:
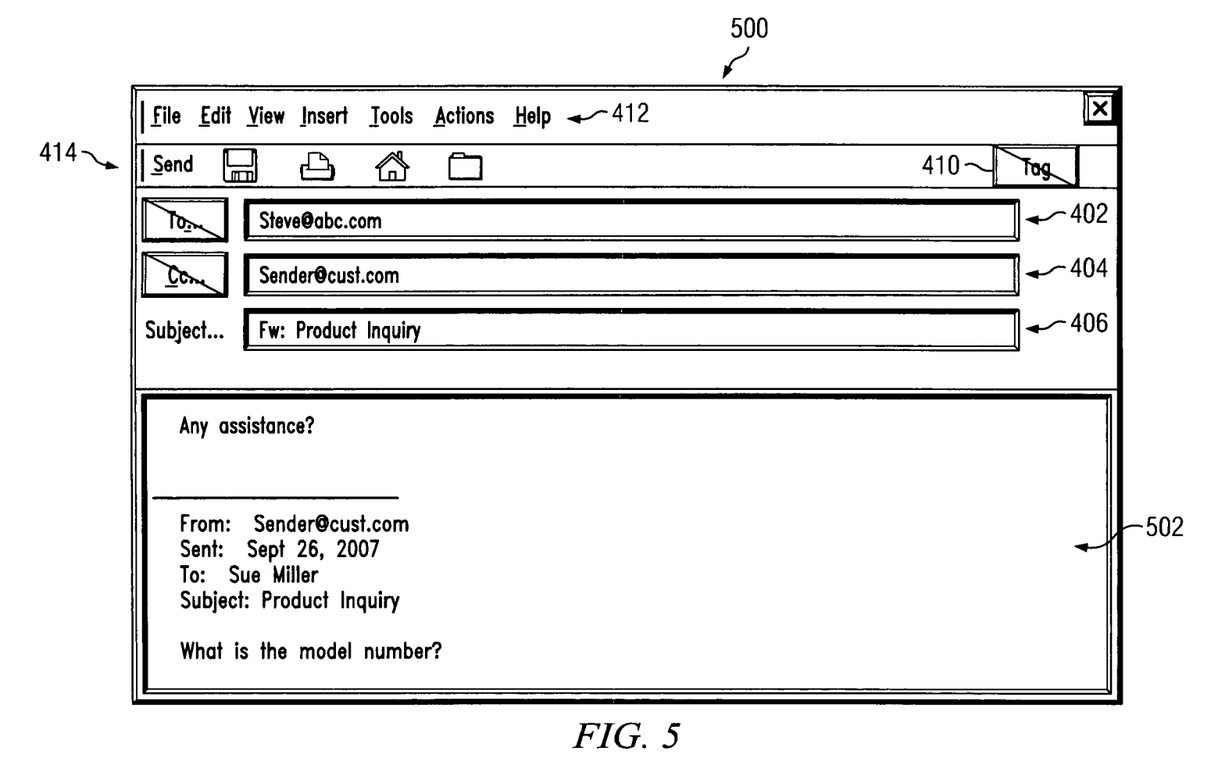
FIG. 5 illustrates an exemplary screenshot from a GUI depicting a subsequently forwarded email of the Email Forward Tagging System according to an embodiment of the present invention.

FIG. 5 illustrates an embodiment 500 of an exemplary screenshot of a GUI depicting email message of the Email Forward Tagging System. Once received at the email receiver's inbox or email client, the message is read to understand the message contained therein. When the email receiver forwards the original email to another individual, such as "steve@abc.com," they include such an address on the To address line 402. But in this example, the original email sender "sender@cust.com" the Email Forward Tagging System automatically includes the original email sender's address in the CC address line 404 so that the email is also delivered back to the original email sender. Further, FIG. 5 shows the body 502 including the address, time, and subject information from the previous message. In one embodiment, a "Tag" icon 410 is displayed in the header section of the email message 500 to notify the email receiver that the original email will be included automatically in their response or reply.

The Tag icon 410 is shown as the word "Tag," but any indicia may be used to provide notice that the subsequent forwarding or replying to the email message 500 will also include an automatic forwarding of the response to the original email sender. As discussed above, the Tag icon may also be displayed if any of the encapsulate sender's address setting 302, automatically forward to sender setting 304, inactivity setting 306, length of response setting 308, or omitted from address list setting 310 have been selected by the original email sender.

Figure 6:
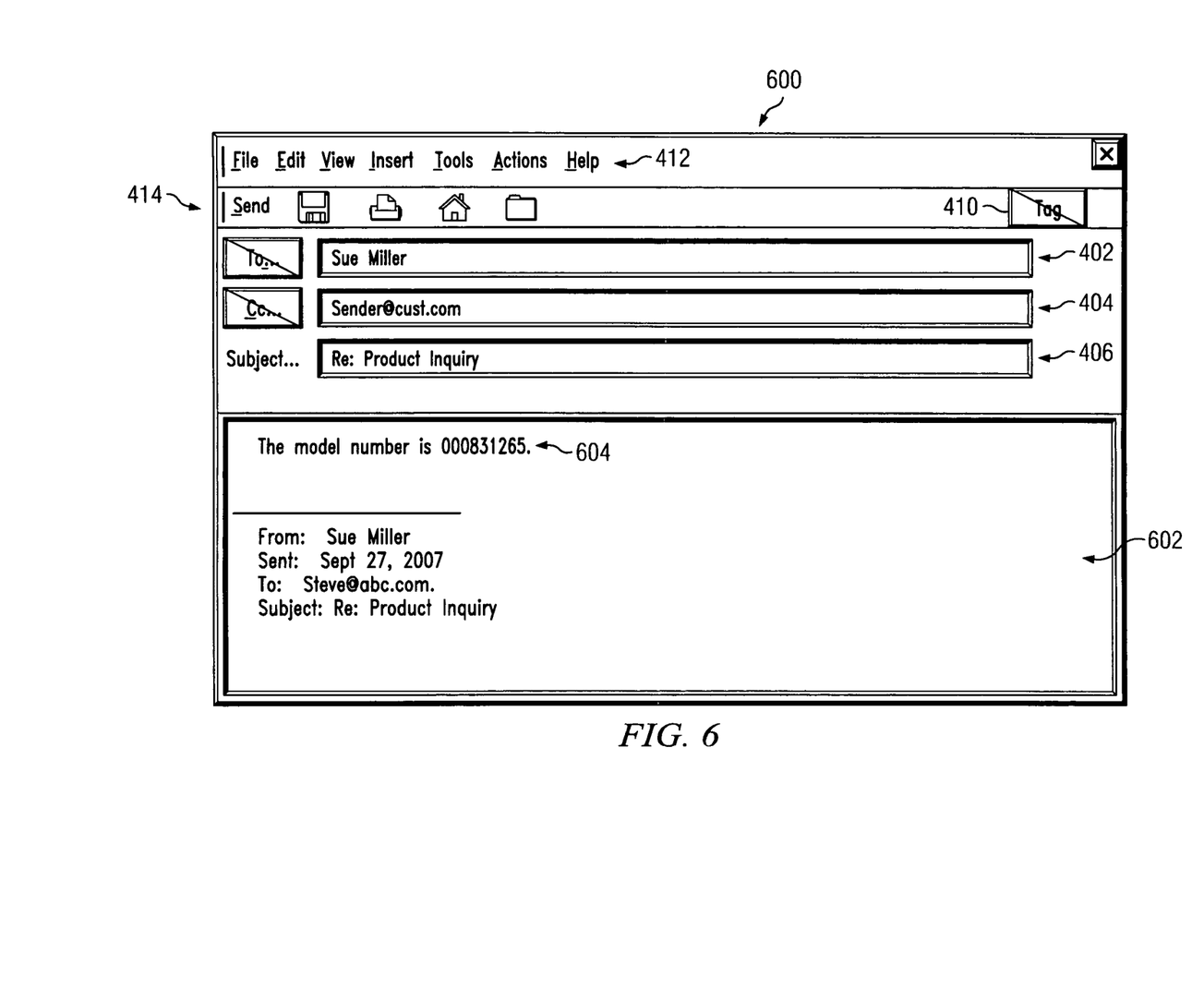
FIG. 6 illustrates an exemplary screenshot from a GUI depicting a subsequently replied email of the Email Forward Tagging System according to an embodiment of the present invention.

FIG. 6 illustrates an embodiment 600 of an exemplary screenshot of a GUI depicting email message of the Email Forward Tagging System. The email message 600 includes the answer provided by another email sender to the original email message 400. The answer is shown in the body 602 of the email message 600. The Email Forward Tagging System automatically included the original email sender's address in the CC address line 404.

In one embodiment, the Email Forward Tagging System may determine whether subsequent email senders, receivers, and responders have included the original email sender's address in their replies and forwards, and if it was omitted it will add it to any of the address lines described above. In another embodiment, the Email Forward Tagging System will automatically add the original email sender's address to an address line on all subsequent forwards and replies regardless of whether it is already included or not. In yet another embodiment, the Email Forward Tagging System may include the original email address in all subsequent forwards and replies, but not show it as such in the To address line 402 or CC address line 404.

In another embodiment and as discussed above, the Email Forward Tagging System may encapsulate the original email sender's address into a data file that accompanies all subsequent email forwards and replies. In this embodiment, when the Email Forward Tagging System determines that the last email in a string has been sent, it automatically appends the original email sender's address into either of the To address line 402 or CC address line 404 to ensure that the final response and accompanying email string is sent back to the original email sender.

Figure 7:
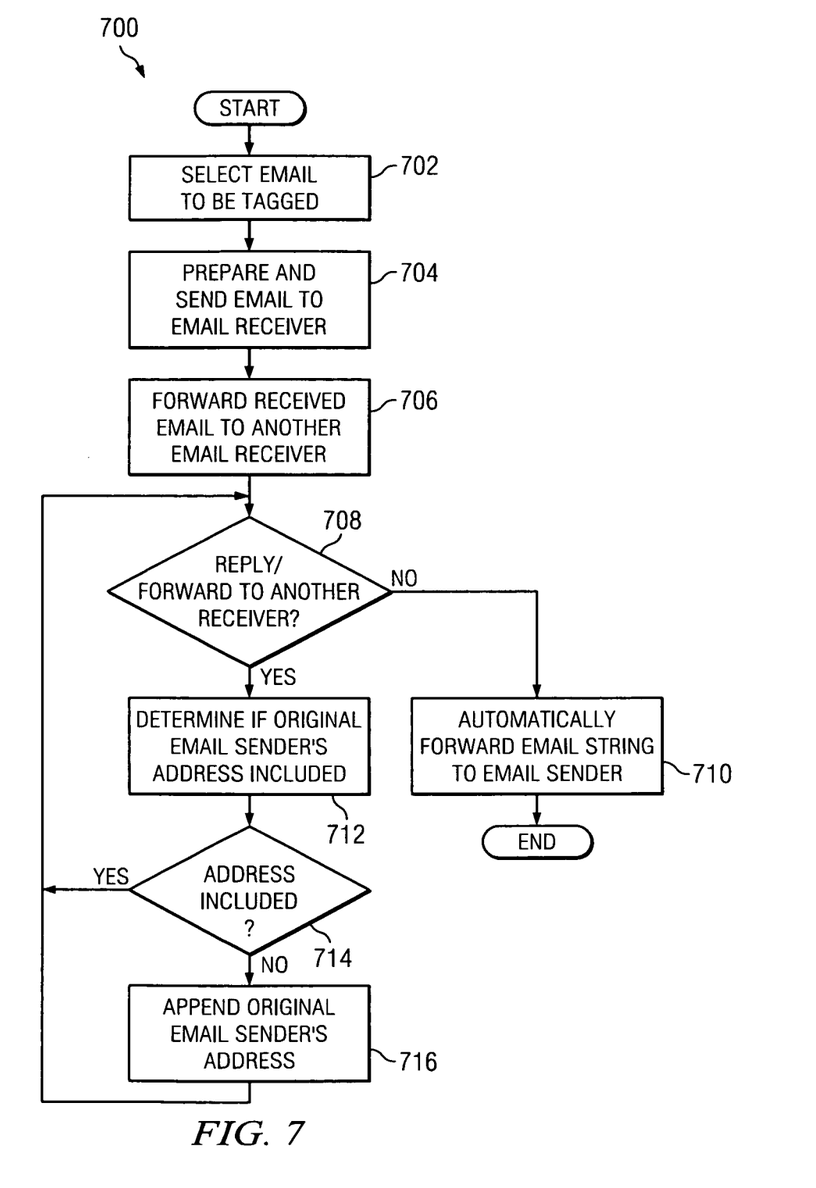
FIG. 7 illustrates a block flow diagram for displaying and selecting Email Forward Tagging System tagging settings to an email sender according to an embodiment of the present invention.

In addition to the aforementioned aspects and embodiments of the present Email Forward Tagging System, the present invention further includes methods for tagging an email for automatic forwarding back to the original email sender. FIG. 7 illustrates such an embodiment 700. The method 700 may be performed by hardware, software, or both, by the exemplary Email Forward Tagging System application. In step 702, an email sender selects an email to be tagged as discussed above by selecting one of the tag all setting 204, tag replies setting 206, and tag forwards setting 208 displayed to the sender by the Email Forward Tagging System. In step 704, the email sender prepares the email message and sends it to an email receiver. In step 706, the email receiver either forwards or replies to the email message to another email receiver. In step 708, an inquiry is made as to whether the first or subsequent email receiver desires to reply/forward the email to another email receiver. If the answer to the inquiry is "no," then the Email Forward Tagging System automatically forwards the email to the original email sender in step 710. If the answer to the inquiry is yes," then the Email Forward Tagging System determines whether the original email sender's address is included in step 712.

In step 714, an inquiry is made as to whether original email sender's address is included in the email forward or reply string. If the answer to the inquiry is "no," then the Email Forward Tagging System appends the original email sender's address to the email string in the To address line 402 or CC address line 404 in step 716 and proceeds back to the inquiry at step 708. If the answer to the inquiry is yes," then the Email Forward Tagging System proceeds back to the inquiry at step 708.

Figure 8:
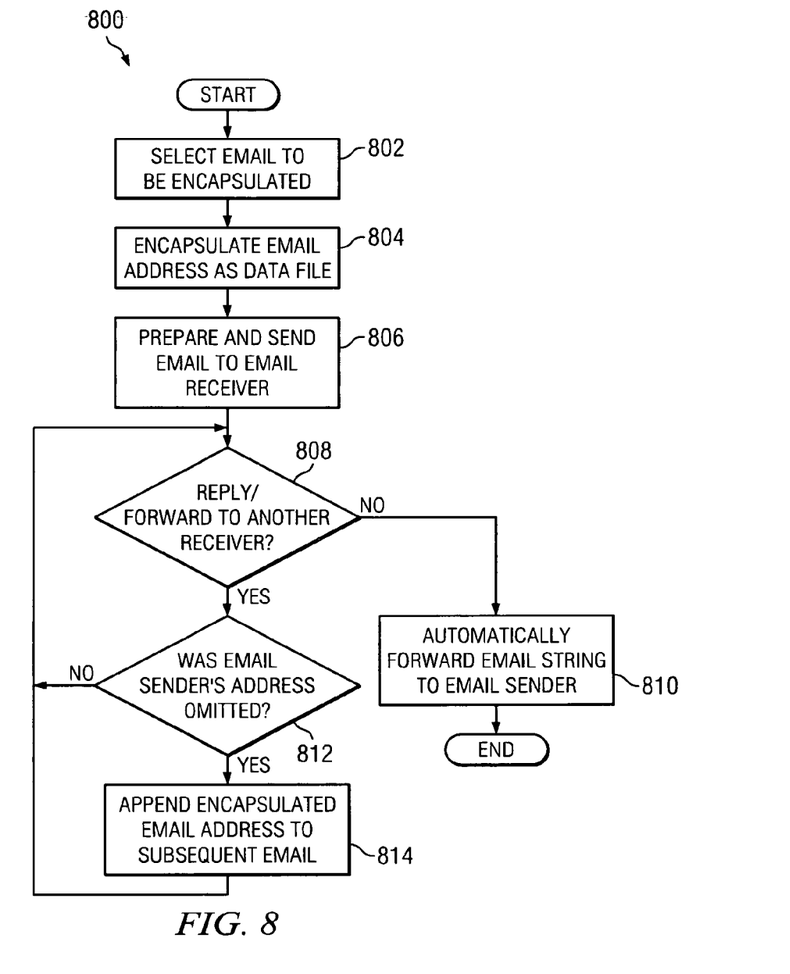
FIG. 8 illustrates a block flow diagram for displaying and selecting Email Forward Tagging System encapsulating settings to an email sender according to an embodiment of the present invention.

FIG. 8 illustrates an embodiment 800 of a block flow diagram of a method for Email Forward Tagging System. Like discussed above, the method 800 may be performed by hardware, software, or both, by the exemplary Email Forward Tagging System application. In step 802, an email sender selects an email to be encapsulated as discussed above by selecting one of the sender's address setting 302, automatically forward to sender setting 304, inactivity setting 306, length of response setting 308, or omitted from address list setting 310 displayed to the sender by the Email Forward Tagging System. In step 804, the Email Forward Tagging System encapsulates the email sender's address into a data file to be attached or accompanying the email. In step 806, the email sender prepares the email message and sends it to an email receiver.

In step 808, an inquiry is made whether the email was forwarded or replied to another email recipient. If the answer to this inquiry is "yes," then another inquiry discussed below occurs at step 812. If the answer to this inquiry is "no," then the Email Forward Tagging System automatically forwards the email to the original email sender in step 810. In step 812, another inquiry is made whether the email sender's address was omitted from the email string subsequent to sending it by the email sender. If the answer to this inquiry is "yes," then the Email Forward Tagging System appends the encapsulated email address to subsequent email suing in the To address line 402 or CC address line 404 at step 814. If the answer to this inquiry is "no," then the process proceeds back to step 808.

There has been described an Email Forward Tagging System. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, other means to append the original email sender's address to subsequent email strings may be used to meet the desired actions without departing from the inventive concepts.

What is claimed:

1. An email forward tagging system comprising:
   means for establishing a connection on a network between a sender's email client having a sender's email address connected to an email-sending server and a first receiver's email client connected to a first email-receiving server, wherein said email-sending server and said first email-receiving server utilize a common email system protocol to send an email on said network;
   means for selecting on said sender's email client a receiver's email address;
   means for displaying to said sender's email client a tagging function;
   means for selecting on said sender's email client said tagging function, wherein the sender to select on said sender's email client said tagging function;
   means for sending, via said common email system protocol, said email from said email sending server to said first email-receiving server;
   means for receiving, via said common email system protocol, said email at said first email-receiving server from said email-sending server;
   means for sending, via said common email system protocol, said email received from said email-sending server in the form of one of a forward email and a reply email to a second email-receiving server connected to said network;
   means for automatically determining whether said forward email or said reply email include said sender's email address as a recipient of said forward email or said reply email; and
   means for automatically forwarding said one of said forward email or said reply email to said sender's email address based upon said tagging function when said sender's email address is omitted from said one of said forward email and said reply email.

2. The email forward tagging system of claim 1 further comprising:
  a second receiver's email client connected to said second email-receiving server.

3. The email forward tagging system of claim 1 wherein said tagging function is selected from the group consisting of a tag all setting, a tag replies setting, and a tag forwards setting.

4. The email forward tagging system of claim 1 wherein said means for automatically forwarding said one of said forward email or said reply email further comprises:
  means for determining the last of one of said forward email and said reply email in a string of said emails subsequent to said sent email.

5. The email forward tagging system of claim 1 further comprising:
  means for displaying a tagging indicia on at least one of said first email-receiving server and said second receiver's email server.

6. A method for automatically forwarding a tagged email, the method comprising
  establishing a connection on a network between a sender's email client having a sender's email address connected to an email-sending server and a first receiver's email client connected to a first email-receiving server, wherein said email-sending server and said first email-receiving server utilize a common email system protocol to send an email on said network;
  selecting on said sender's email client a receiver's email address;
  displaying to said sender's email client a tagging function;
  receiving from the sender a selection on said sender's email client of said tagging function;
  sending, via said common email system protocol, said email from said email-sending server to said first email-receiving server;
  receiving, via said common email system protocol, said email at said first receiver's email server from said email-sending server;
  sending, via said common email system protocol, said received email in the form of one of a forward email or a reply email to a second email-receiving server connected to said network; and
  based upon said tagging function, automatically forwarding said one of said forward email or said reply email to said sender's email address when said sender's email address is omitted from said one of said forward email or said reply email.

7. The method for automatically forwarding a tagged email of claim 6 wherein said tagging function is selected from the group consisting of a tag all setting, a tag replies setting, and a tag forwards setting.

8. The method for automatically forwarding a tagged email of claim 6 wherein said automatically forwarding said one of said forward email or said reply email further comprises:
  determining the last of one of said forward email and said reply email in a string of said emails subsequent to said sent email.

9. The method for automatically forwarding a tagged email of claim 6 further comprising:
  displaying a tagging indicia on at least one of said first receiver's email server and said second receiver's email server.

10. An email forward tagging system comprising:
  means for establishing a connection on a network between a sender's email client having a sender's email address connected to an email-sending server and a first receiver's email client connected to a first email-receiving server, wherein said email-sending server and said first email-receiving server utilize a common email system protocol to send an email on said network;
  means for selecting on said sender's email client a receiver's email address;
  means for displaying to said sender's email client an encapsulation function;
  means for selecting on said sender's email client said encapsulation function;
  means for displaying to said sender's email client a tagging function;
  means for selecting on said sender's email client said tagging function, wherein the sender to select on said sender's email client said tagging function;
  means for sending, via said common email system protocol, said email from said email sending server to said first email-receiving server;
  means for receiving, via said common email system protocol, said email at said first receiver's email server from said email-sending server;
  means for sending, via said common email system protocol, said email received from said email-sending server in the form of one of a forward email and a reply email to a second email-receiving server connected to said network;
  means for automatically appending said sender's email address to said one of said forward email and said reply email when said sender's email address is omitted from said one of said forward email or said reply email; and
  means for automatically forwarding said one of said forward email or said reply email to said sender's email address based upon said tagging function.

11. The email forward tagging system of claim 10 wherein said means for automatically appending said sender's email address to said one of said forward email and said reply email further comprises:
  means for determining the inactivity of said one of said forward emails and said reply emails.

12. The email forward tagging system of claim 10 wherein said means for automatically appending said sender's email address to said one of said forward email and said reply email further comprises:
  means for determining the length of a body of one of said forward emails and said reply emails.

13. The email forward tagging system of claim 10 further comprising:
  means for displaying a tagging indicia on at least one of said first receiver's email server and said second receiver's email server.

14. A method for automatically forwarding a tagged email, the method comprising:
  receiving, via a common email system protocol over a communication network, an email at a first receiver's email server from an email-sending server, the email being tagged by the sender with a tagging indicia and originating from a sender's email address;
  sending, via said common email system protocol, said email received from said email-sending server in the form of one of a forward email and a reply email to a second email-receiving server connected to said network; and
  based on the tagging indicia, automatically forwarding said one of said forward email or said reply email to said sender's email address when said sender's email address is omitted from said one of said forward email or said reply email.

15. The method of claim 14, further comprising:
means for determining the last of one of said forward email and said reply email in a string of said emails subsequent to said sent email.

16. The method of claim 14, further comprising:
displaying the tagging indicia on at least one of said first email-receiving server and said second receiver's email server.

17. The method of claim 14, further comprising:
determining the inactivity of said one of said forwarded emails and said replied emails.

18. The method of claim 14, further comprising:
determining the length of a body of one of said forwarded emails and said replied emails.

\* \* \* \* \*